US008705192B1

(12) United States Patent
Zhang et al.

(10) Patent No.: US 8,705,192 B1
(45) Date of Patent: Apr. 22, 2014

(54) ENHANCED QUALITY-SORTING SCHEDULER

(71) Applicant: LSI Corporation, Milpitas, CA (US)

(72) Inventors: Fan Zhang, Milpitas, CA (US); Ming Jin, Fremont, CA (US); Jun Xiao, Fremont, CA (US); Shaohua Yang, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 22 days.

(21) Appl. No.: 13/650,479

(22) Filed: Oct. 12, 2012

(51) Int. Cl.
*G11B 5/09* (2006.01)

(52) U.S. Cl.
USPC .......................................................... 360/53

(58) Field of Classification Search
None
See application file for complete search history.

(56) References Cited

U.S. PATENT DOCUMENTS

| 5,606,466 | A | * | 2/1997 | Fisher et al. .................... 360/51 |
| 5,740,358 | A | * | 4/1998 | Geldman et al. ............. 714/47.3 |
| 6,975,570 | B1 | * | 12/2005 | Gushima et al. ........... 369/47.31 |
| 7,274,639 | B1 | * | 9/2007 | Codilian et al. ........... 369/53.17 |
| 7,607,039 | B2 | * | 10/2009 | Shikama et al. ............. 714/6.13 |
| 7,929,234 | B1 | * | 4/2011 | Boyle et al. ..................... 360/31 |
| 2003/0031106 | A1 | * | 2/2003 | Ozaki ........................ 369/53.17 |
| 2006/0218211 | A1 | * | 9/2006 | Shikama et al. .............. 707/205 |
| 2007/0189137 | A1 | * | 8/2007 | Saito et al. ................. 369/47.32 |
| 2009/0241011 | A1 | * | 9/2009 | Yamamoto .................... 714/769 |
| 2011/0083058 | A1 | * | 4/2011 | Hu et al. ....................... 714/758 |
| 2013/0111262 | A1 | * | 5/2013 | Taylor et al. ................. 714/4.11 |

* cited by examiner

*Primary Examiner* — Peter Vincent Agustin
(74) *Attorney, Agent, or Firm* — Advent, LLP

(57) ABSTRACT

Aspects of the disclosure pertain to a read channel system and method for providing sector prioritization for promoting improved sector processing performance. The system and method, during processing of sectors of data, prioritize each of the sectors for further processing based upon: a global iteration index of each sector, trapping set characteristics of each sector and processing latency of each sector.

20 Claims, 2 Drawing Sheets

ENHANCED QUALITY-SORTING SCHEDULER

BACKGROUND

A read channel is a circuit in a disk drive which: 1) encodes data bits into magnetic flux changes for recording; and 2) decodes magnetic flux changes into bits for reading. Current read channel systems often suffer from performance issues.

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter in any manner Aspects of the disclosure pertain to a read channel system and method for providing sector prioritization for promoting improved sector processing performance.

BRIEF DESCRIPTION OF THE DRAWINGS

The detailed description is described with reference to the accompanying figures.

DETAILED DESCRIPTION

Figure 1:
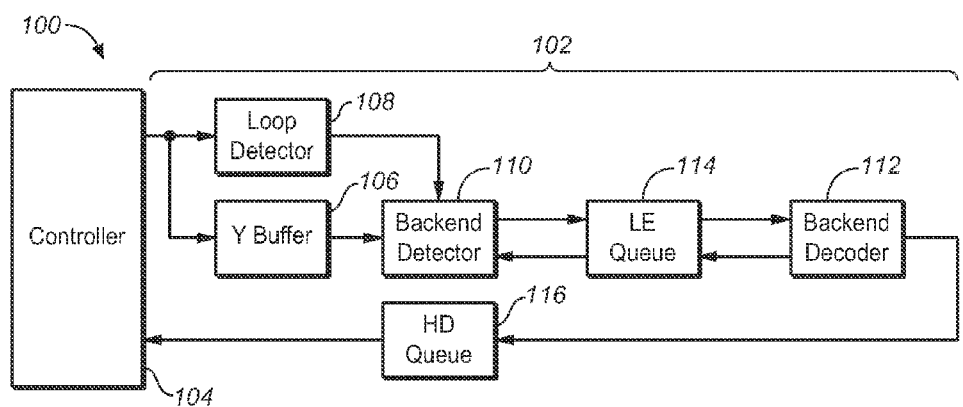
FIG. 1 is an example conceptual block diagram schematic of a read channel system.

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope. Among other things, the features of the disclosure can be facilitated by methods, devices, and/or embodied in articles of commerce. The following detailed description is, therefore, not to be taken in a limiting sense.

A read channel is a circuit in a disk drive which: 1) encodes data bits into magnetic flux changes for recording; and 2) decodes magnetic flux changes into bits for reading. A read channel system can perform retained sector reprocessing (RSR) when processing sectors of data. In a typical read channel system, a data buffer, such as a Y-buffer, can be implemented for temporarily storing data (e.g., sectors) received by the read channel system. In the typical read channel system performing typical RSR, the Y-buffer can be dynamically shared between in-order sectors and retained sectors.

Further, in the typical read channel system, a sector-quality-sorting based scheduler can be implemented by the read channel system. The scheduler sorts the sectors by sector quality metric. For example, during processing, the scheduler can dynamically prioritize sectors, such that it causes the system to process good sectors (e.g., in-order sectors) first, followed by processing of bad sectors (e.g., retained sectors). In these typical read channel systems, two metrics can be involved in sorting. For example, for sectors with one global iteration, a mean squared error (MSE) metric from a loop detector of the read channel system can be used. Further, for sectors with more than one global iteration, a number of unsatisfied checks (USCs) can be used as a metric.

Typical read channel systems implementing the sorting metrics described above often suffer from a number of drawbacks. For example, as mentioned above, a first sorting metric (e.g., quality metric) implemented by typical read channel systems for sectors with more than one global iteration only considers the number of USCs. In the event there are multiple sectors with very different numbers of global iterations, this metric is misleading. For example, a sector with only one global iteration and forty USCs usually has better quality than a sector with twenty-seven global iterations and thirty USCs. Further, with typical read channel systems, when a trapping set error(s) occurs, the number of USCs is usually small, so a sector with a trapping set error(s) looks good to current quality sorting rules. Thus, the detector and decoder of the read channel system keep working on it and waste processing slots. Still further, with typical read channel systems, further processing of some bad sectors will be delayed too long, since good sectors keep coming in. Thus, the bad sectors will not get a chance to be processed further until latency kickout occurs.

Because of the above drawbacks, during the normal stage of signal processing of sectors by the typical read channel system, Sector Failure Rate (SFR) performance of the system is less efficient than desired.

As more fully set forth below, aspects of the disclosure include a system and method for promoting improved SFR performance (e.g., 0.04 decibel (dB) SFR gain) during sector processing.

Figure 3:
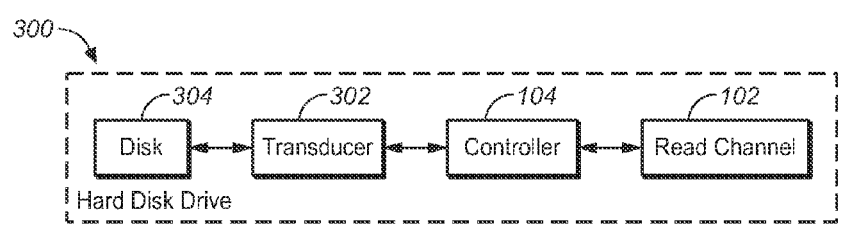
FIG. 3 is an example conceptual block diagram schematic of a disk drive system including a read channel system.

As indicated in FIG. 1 (FIG. 1), a system 100 is shown. In embodiments, the system 100 is a read channel system. Further, in embodiments, the system 100 is an iterative codec system architecture. Still further, in embodiments, the system 100 is a read channel backend codec system architecture. In further embodiments, the system 100 is implemented in a hard disk drive system 300 (as shown in FIG. 3). In embodiments, the system 100 includes a read channel 102 (e.g., a read channel backend, a read channel backend codec). The read channel 102 is a circuit (e.g., an integrated circuit, an electrical circuit) implemented in a disk drive which: 1) encodes data bits into magnetic flux changes for recording; and 2) decodes magnetic flux changes into bits for reading. Still further, the read channel 102 can be a single chip or integrated as part of a system on chip (SoC).

In embodiments, the system 100 includes a controller 104. The controller 104 is connected to (e.g., communicatively coupled with) the read channel 102. For example, the controller 104 is connected to the read channel 102 (e.g., read channel backend codec) via an analog front end (e.g., read channel analog front end). In embodiments, the controller 104 is a disk controller. The controller 104 is configured for transferring data and signals (e.g., control signals) between the read channel 102 and a host system during read and write operations. For example, the controller 104 is configured for being connected to a head transducer (e.g., read-write head) 302 of the hard disk drive system 300. During read operations, the head transducer is configured for reading data from a disk (e.g., a disk platter of a hard disk drive (HDD)) 304 and providing the read data to the controller 104. The controller 104 is configured for provide the read data received from the head transducer 302 to the read channel 102. During write operations, the read channel 102 is configured for providing write data to the controller 104, the controller 104 is configured for providing the write data received from the read channel 102 to the head transducer 302, and the head transducer 302 is configured for writing the write data received from the controller 104 to the disk.

In embodiments, the controller 104 is configured for managing (e.g., controlling) a position of the head transducer 302. For example, during read operations, the controller 104 is configured for selecting a track to be read and for causing the head transducer 302: a.) to move (e.g., change its position) relative to the disk 304, such that the head transducer 302 is aligned to read the controller-selected track; and b.) to read the controller-selected track of data from the disk 304. The head transducer 302 provides the read data from the controller-selected track to the controller 104, the controller 104 then provides the read data from the controller-selected track to the read channel 102. The read data received by the read channel (e.g., read channel backend codec) via the controller 104 is digital data which is encoded.

Further, the controller 104 is configured for: selecting a next (e.g., second) track to be read; causing the head transducer 302 to move to a new position relative to the disk 304; causing the head transducer 302 to read data from the second selected track and to transmit the read data to the controller 104; receiving the transmitted read data from the second selected track; and transmitting the received read data from the second selected track to the read channel 102. The-above described transition process the system 100 undergoes as the controller 104 transitions from receiving the read data from the first selected track to receiving read data from the second selected track is a process known as track switching. Latency is associated with this track switching process (e.g., track switching latency).

As mentioned above, the controller 104 is configured for receiving read data from the head transducer 302 and for transmitting the received read data to the read channel 102. For example, the controller 104 is configured for transmitting a plurality of sectors (e.g., a track) of read data to the read channel 102, the plurality of sectors having been read from the disk 304. The read channel 102 is configured for processing the plurality of sectors of read data received from the controller 104. For example, when the system 100 is operating in normal mode, each of the plurality of sectors received by the read channel 102 is processed via 28 global iterations and 10 local iterations per global iteration. In embodiments, the controller 104 implements (e.g., includes) a client-server based scheduler for accommodating concurrent processing of the plurality of sectors. In embodiments, the term "scheduler" as described herein, is implemented as hardware, firmware, software or a combination thereof.

In embodiments, the system 100 is configured for performing retained sector reprocessing (RSR). For example, after the plurality of sectors is processed by the read channel 102, the processed sectors are provided (e.g., transmitted) from the read channel 102 to the controller 104. The controller 104 is configured for identifying (e.g., classifying) each sector included in the plurality of processed sectors as being either: a.) normal (e.g., in-order); or b.) failed. If one or more sectors included in the plurality of processed sectors are identified by the controller 104 as being in-order, the controller 104 is configured for determining that no further processing of the one or more in-order sectors by the read channel 102 is needed. However, if one or more sectors included in the plurality of processed sectors are identified by the controller 104 as being failed, the controller 104 (e.g., via the scheduler) is configured for saving y-samples corresponding to the one or more failed sectors (e.g., retained sectors) and for scheduling and initiating reprocessing of the failed (e.g., retained) sectors by the read channel 102. For example, the retained sectors are reprocessed by the read channel 102 via 180 global iterations (for 512 bytes (512 B)) or 37 global iterations (for 4 kilobytes (4 KB)) and 20 local iterations per global iteration. RSR provides a performance gain (e.g., 0.05 to 0.15 decibels (dB), depending on conditions) for the system 100 via the extra global and local iterations on the retained sectors.

The system 100, as mentioned above, during track switching, undergoes a transition as the controller 104 transitions from receiving the read data (e.g., sectors) from the first selected track to receiving read data (e.g., sectors) from the second selected track. The latency associated with track switching provides a window of time for the read channel 102 to reprocess the retained sectors (e.g., failed sectors) of the first selected track and to transmit those reprocessed sectors to the controller 104 before reading of data (e.g., sectors) from the second selected track occurs (e.g., before the controller 104 receives read data from the second selected track). As mentioned above, the controller 104 (via the scheduler) is configured for scheduling reprocessing of the failed sectors by the read channel 102 during the above-referenced track switching latency time window.

In embodiments, a size of a track of read data is equivalent to a number of sectors of that track which the controller 104 obtains, via the head transducer 302, during a consecutive read. Track size is, at times, highly application-dependent, varying from tens (10 s) to thousands (1000 s) of sectors per track.

The read channel 102 includes a buffer 106, which is connected to the controller 104. For example, the buffer 106 is a Y-buffer. The buffer 106 is a memory which is temporarily used for storing input or output data. For example, the buffer 106 is configured for receiving read data (e.g., sectors) from the controller 104.

In embodiments, the read channel 102 includes a first detector 108, which is connected to the controller 104. For example, the first detector 108 is a loop detector. The first detector 108 is configured for receiving a signal (e.g., data, information). For example, the first detector 108 is configured for receiving one or more signals (e.g., information) from the controller 104, the one or more signals corresponding to the read data (e.g., sectors) provided from the controller 104 to the buffer 106. For example, the controller 104 is configured for providing the one or more signals to the first detector 108 in parallel with providing the read data to the buffer 106.

In embodiments, the read channel 102 further includes a second detector 110, which is connected to both the first detector (e.g., the loop detector) 108 and the buffer (e.g., Y-buffer) 106. For example, the second detector 110 is a backend detector. The second detector 110 is configured for receiving the read data via the buffer 106. The second detector 110 is further configured for receiving the signals (e.g., information) corresponding to the read data via the first detector 108.

In embodiments, the read channel 102 further includes a decoder 112, which is connected to the second detector (e.g., the backend detector) 110. For example, the decoder 112 is a backend decoder. Further, the decoder 112 is connected to the controller 104. The decoder 112 is configured for receiving the read data. Further, the decoder 112 is configured for receiving the signals (e.g., information) corresponding to the read data. For example, the read data provided from the controller 104 is routed via the buffer 106 and the second detector 110 to the decoder 112. Further, the signals (e.g., information) corresponding to the read data are routed via the first detector 108 and the second detector 110 to the decoder 112. For example, the read data and the signals corresponding to the read data are combined at the second detector 110 and routed from the second detector 110 to the decoder 112 as a first queue (e.g., LE queue) 114. The decoder 112 is configured for processing (e.g., decoding) the read data (e.g., sectors) and for providing the processed read data to the controller 104. For example, the processed read data is provided to the controller 104 as a second queue (e.g., Hard Drive (HD) queue) 116.

During processing of the plurality of sectors by the read channel 102, the controller 104 is configured (e.g., via a sector-quality-sorting based scheduler of the controller) for sorting (e.g., prioritizing) sectors for dynamically determining an order in which the plurality of sectors are to be further processed. For example, the controller 104 implements the scheduler to sort the sectors based upon a sorting metric (e.g., quality metric). In embodiments, the controller 104 is configured for determining (e.g., calculating) and assigning a quality metric to each sector included in the plurality of sectors. Further, the controller 104 is configured for determining and assigning the quality metrics based upon a global iteration index of each sector included in the plurality of sectors. For example, if two sectors included in the plurality of sectors have a same number of USCs, but different global iteration indices, the sector of the two sectors which has the larger global iteration index is assigned a larger quality metric than the other sector of the two sectors. The sector of the two sectors which has the larger quality metric is identified by the controller 104 as being the lower quality sector of the two sectors and is given a lower priority for further processing (e.g., will be scheduled, prioritized and/or sorted in such a manner that it will undergo further processing after the higher quality sector undergoes further processing). For example, the quality metric is determined (e.g., calculated) using the following equation:

$$(1+\alpha g/g_{max})*USC$$

where g is global iteration index, $g_{max}$ is maximum global iteration index, USC is number of USCs and α is a positive parameter needing to be tuned. Further, when two sectors included in the plurality of sectors have a same global iteration index, but a different number of USCs, the sector of the two sectors which has the larger number of USCs will be assigned a larger quality metric than the other sector of the two sectors.

In embodiments, the controller 104 is further configured for determining and assigning the quality metrics based upon trapping set characteristics of each sector included in the plurality of sectors. For example, when a first sector included in the plurality of sectors is identified by the controller 104 as having a trapping set error and a second sector included in the plurality of sectors is identified by the controller 104 as not having a trapping set error, the first sector (e.g., the sector identified as having the trapping set error) is assigned a larger quality metric than the second sector. This promotes processing efficiency of the system 100.

The controller 104 is configured for determining and assigning the quality metrics to the plurality of sectors based upon a processing latency (e.g., time already spent waiting for further processing) for each sector included in the plurality of sectors. For example, the quality metric is determined (e.g., calculated) using the following equation:

$$(1+\alpha g/g_{max})*(1-\beta t/t_{max})*USC$$

where β is a parameter in (0,1), t is latency and $t_{max}$ is maximum latency. In embodiments, when a first sector included in the plurality of sectors is identified by the controller 104 as having a greater (e.g., longer) processing latency than a second sector included in the plurality of sector, the first sector is assigned a larger quality metric than the second sector. This effectively gives a higher priority for further processing to sectors having longer processing latency times (e.g., have been waiting for longer amounts of time to be processed further).

The system 100 disclosed herein provides improved SFR performance over typical systems (e.g., codecs) without introducing extra track latency. In embodiments, the system 100 is configurable for operating in an out-of-order hard disk controller (HDQ) transfer mode for achieving large maximum global iteration in the sector-quality-sorting based scheduler. When the system 100 is configured in out-of-order HDQ transfer mode, converged sectors in HDQ are able to be transferred immediately (e.g., do not have to wait for the transfer of old sectors). The system 100 is configured for implementing any of a number of various low density parity check (LDPC) codes and decoding algorithms for facilitating the immediate transfer of the converged sectors in HDQ.

In embodiments, the system 100 is configured for providing system resource allocation based upon predicted bit flipping counts (e.g., predicted detector bit flipping counts, predicted decoder bit flipping counts). In embodiments, the relationship between detector bit flipping counts versus global iteration is predicted (e.g., extrapolated) by using a polynomial function, such as:

$$a(x-b)$$

In embodiments, the relationship between decoder bit flipping counts versus global iteration is predicted by using a negative log function, such as:

$$y=a\log(bx-c)$$

Based upon the above, bit flipping counts of a particular sector are predictable based on the sector's history. System resource allocation problems are reducible to a maximization problem of the bit flipping counts. The system 100 disclosed herein implements scheduler rules for increasing (e.g., maximizing) bit flipping counts based on extrapolation and prediction of the bit flipping counts. Assuming there are k sectors in the system (e.g., queuing system) 100 and k changes over time, a goal is to optimize (e.g., in terms of maximizing the bit flipping counts or reducing the number of errors) a resource allocation scheme of the system 100, so that subsequent processed sectors provide a maximum error count decrease for a detector/decoder run.

In order to estimate error count reduction before running detector/decoder for a sector, extrapolation parameters a, b and c in the above-referenced extrapolation functions are to be estimated. In a low error rate regime, trapping set errors sometimes kick in. For a particular sector, an error count estimation calculated by the extrapolation functions is sometimes not informative. Error floor-related scheduling rules often occur. There are many ways of estimating the parameters a, b and c in the above-referenced log function and polynomial function. For example, given the bit flipping counts collected by a normal operation mode of the system 100, a least square curve fitting, as set forth below, is used (e.g., solved) to estimate the extrapolation parameters:

$$\arg\min_{a,b,c}(f(a,b,c,x)-\bar{f}(x))^2$$

where f is either a detector extrapolation equation or a decoder extrapolation equation and is an average bit flipping count collected in the x-th global iteration. In embodiments, extrapolation parameters a, b and c are calculated by taking the derivative of the object function over a, b and c and setting them to be zero.

In embodiments, when predicting bit flipping counts (e.g., error counts) reduction, for iteration x0, the following first order Taylor expansion approximation of the extrapolated function is used to estimate the bit flipping counts of the next decoder/detector run by the first order expansion of the extrapolation curve at x0:

$$\Delta f = df/dx * (x - x_o)$$

Based on the idea of promoting (e.g., maximizing) error count reduction, scheduler rules implemented by the system 100 are as follows. For the detector (e.g., backend detector) 110, if no sector in the first (e.g., LE) queue 114 is ready for the detector 110, and the first queue 114 has a free slot, detector 110 is configured for choosing a best sector in Y-buffer 106 to process. In embodiments, when one or more sectors in the first queue 114 are ready for the detector 110, the detector 110 chooses the sector which provides a maximum number of bit flipping counts in the next detector run to process. If no slot is free in the first queue 114, and no sectors in the first queue 114 are ready for the detector 110, the detector is configured for waiting. For the decoder 112, if one or more sectors in the first queue 114 are ready for the decoder 112, the decoder 112 is configured for first calculating a bit flipping count prediction for such sectors, then selecting a sector to process from amongst such sectors which has a maximum bit flipping count. If no sector in the first queue 114 is ready for the decoder 112, the decoder 112 is configured for waiting.

Figure 2:
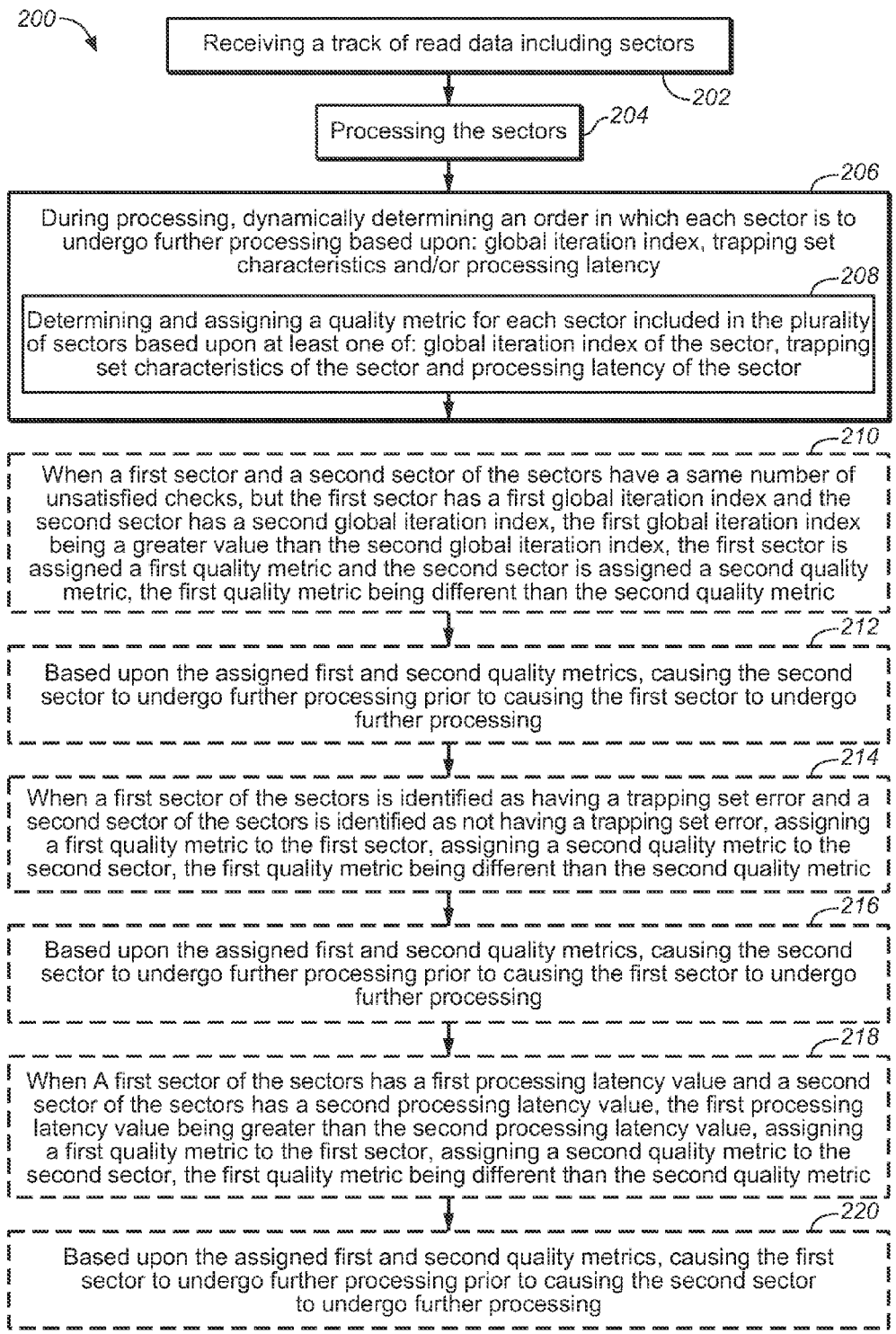
FIG. 2 is a flow chart illustrating a method for sector prioritization in a read channel system.

FIG. 2 is a flowchart illustrating a method for sector prioritization in a read channel system. The method 200 includes the step of receiving a track of read data via a controller of the system, the track of read data including a plurality of sectors of read data 202. The method further includes the step of processing the plurality of sectors of read data 204. For example, the read channel 102 is configured for processing the plurality of sectors of read data.

The method 200 further includes the step of, during processing of the plurality of sectors, dynamically determining an order in which each sector included in the plurality of sectors is to undergo further processing based upon at least one of: a global iteration index of the sector, trapping set characteristics of the sector and processing latency of the sector 206. For example, the controller 104 is configured for determining an order in which each sector included in the plurality of sectors is to undergo further processing based upon at least one of: a global iteration index of the sector, trapping set characteristics of the sector and processing latency of the sector. In embodiments, the step of dynamically determining the order in which each sector included in the plurality of sectors is to undergo further processing 206 includes: determining and assigning a quality metric for each sector included in the plurality of sectors based upon at least one of: global iteration index of the sector, trapping set characteristics of the sector and processing latency of the sector 208. For example, in embodiments, the controller 104 is configured for determining and assigning a quality metric for each sector included in the plurality of sectors based upon at least one of: global iteration index of the sector, trapping set characteristics of the sector and processing latency of the sector.

The method 200 further includes the step of, when a first sector and a second sector included in the plurality of sectors have a same number of unsatisfied checks, but the first sector has a first global iteration index and the second sector has a second global iteration index, the first global iteration index being a greater value than the second global iteration index, the first sector is assigned a first quality metric and the second sector is assigned a second quality metric, the first quality metric being different than the second quality metric 210. The method 200 further includes the step of, based upon the assigned first and second quality metrics, causing the second sector to undergo further processing prior to causing the first sector to undergo further processing 212. For example, the second and first sectors undergo further processing by the read channel 102 of the system 100 and are processed in an order which is based upon the assigned quality metrics.

As an alternative to steps 210 and 212, the method 200, in embodiments, includes the steps of: when a first sector included in the plurality of sectors is identified as having a trapping set error and a second sector included in the plurality of sectors is identified as not having a trapping set error, assigning a first quality metric to the first sector, assigning a second quality metric to the second sector, the first quality metric being different than the second quality metric 214; and based upon the assigned first and second quality metrics, causing the second sector to undergo further processing prior to causing the first sector to undergo further processing 216.

As a further alternative to steps 210 and 212, the method 200, in embodiments, includes the steps of: when a first sector included in the plurality of sectors has a first processing latency value and a second sector included in the plurality of sectors has a second processing latency value, the first processing latency value being greater than the second processing latency value, assigning a first quality metric to the first sector, assigning a second quality metric to the second sector, the first quality metric being different than the second quality metric 218; and based upon the assigned first and second quality metrics, causing the first sector to undergo further processing prior to causing the second sector to undergo further processing 220.

Further, as mentioned above, it is also contemplated that in embodiments, the quality metrics are assigned based upon more than one of: global iteration index of the sector, trapping set characteristics of the sector and processing latency of the sector.

It is to be noted that the foregoing described embodiments may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the embodiments described herein may be conveniently implemented in forms of a software package. Such a software package may be a computer program product which employs a non-transitory computer-readable storage medium including stored computer code which is used to program a computer to perform the disclosed functions and processes disclosed herein. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A read channel system, comprising:
   a controller, the controller configured for receiving a track of read data, the track of read data including a plurality of sectors of read data;
   a buffer, the buffer being connected to the controller, the buffer configured for receiving the plurality of sectors of read data from the controller; and
   a decoder, the decoder being connected to the buffer, the decoder configured for receiving the plurality of sectors of read data from the buffer, the decoder configured for processing the plurality of sectors of read data and transmitting the processed sectors of read data to the controller, the controller configured for determining if one or more of the processed sectors are failed, and when one or more of the processed sectors are determined as being failed, the controller is configured for scheduling and initiating reprocessing of the failed sectors,
   wherein the controller, during processing of the plurality of sectors, is configured for prioritizing each sector included in the plurality of sectors for further processing based upon at least one of: a global iteration index of the sector, trapping set characteristics of the sector and a processing latency of the sector.

2. The read channel system as claimed in claim 1, wherein the controller implements a scheduler for prioritizing each sector included in the plurality of sectors for further processing based upon at least one of: global iteration index of the sector, trapping set characteristics of the sector and processing latency of the sector.

3. The read channel system as claimed in claim 2, wherein prioritizing each sector included in the plurality of sectors includes calculating a quality metric for each sector included in the plurality of sectors.

4. The read channel system as claimed in claim 1, further comprising:
   a first detector, the first detector being connected to the controller, the first detector configured for receiving signals corresponding to the plurality of sectors of read data.

5. The read channel system as claimed in claim 4, further comprising:
   a second detector, the second detector being connected to the first detector and the buffer, wherein the plurality of sectors of read data are routed from the buffer to the decoder via the second detector.

6. The read channel system as claimed in claim 3, wherein the scheduler implemented by the controller is a sector-quality-sorting based scheduler.

7. The read channel system as claimed in claim 3, wherein the assigned reprocessing time occurs during a track switching window for the controller.

8. The read channel system as claimed in claim 1, wherein the read channel system is a read channel backend codec system.

9. The read channel system as claimed in claim 4, wherein the first detector is a loop detector.

10. The read channel system as claimed in claim 5, wherein the buffer is a Y-buffer.

11. A method for sector prioritization in a read channel system, comprising:
    receiving a track of read data via a controller of the system, the track of read data including a plurality of sectors of read data;
    processing the plurality of sectors via a read channel of the system; and
    during processing of the plurality of sectors, dynamically determining an order in which each sector included in the plurality of sectors is to undergo further processing based upon at least one of: a global iteration index of the sector, trapping set characteristics of the sector and processing latency of the sector.

12. The method as claimed in claim 11, wherein dynamically determining the order in which each sector included in the plurality of sectors is to undergo further processing includes:
    determining and assigning a quality metric for each sector included in the plurality of sectors based upon at least one of: global iteration index of the sector, trapping set characteristics of the sector and processing latency of the sector.

13. The method as claimed in claim 12, further comprising:
    when a first sector and a second sector included in the plurality of sectors have a same number of unsatisfied checks, but the first sector has a first global iteration index and the second sector has a second global iteration index, the first global iteration index being a greater value than the second global iteration index, the first sector is assigned a first quality metric and the second sector is assigned a second quality metric, the first quality metric being different than the second quality metric; and
    based upon the assigned first and second quality metrics, causing the second sector to undergo further processing prior to causing the first sector to undergo further processing.

14. The method as claimed in claim 12, further comprising:
    when a first sector included in the plurality of sectors is identified as having a trapping set error and a second sector included in the plurality of sectors is identified as not having a trapping set error, assigning a first quality metric to the first sector, assigning a second quality metric to the second sector, the first quality metric being different than the second quality metric; and
    based upon the assigned first and second quality metrics, causing the second sector to undergo further processing prior to causing the first sector to undergo further processing.

15. The method as claimed in claim 12, further comprising:
    when a first sector included in the plurality of sectors has a first processing latency value and a second sector included in the plurality of sectors has a second processing latency value, the first processing latency value being greater than the second processing latency value, assigning a first quality metric to the first sector, assigning a second quality metric to the second sector, the first quality metric being different than the second quality metric; and
    based upon the assigned first and second quality metrics, causing the first sector to undergo further processing prior to causing the second sector to undergo further processing.

16. A non-transitory computer-readable medium having computer-executable instructions for performing a method for sector prioritization in a read channel system, the method comprising:
    receiving a track of read data via a controller of the system, the track of read data including a plurality of sectors of read data;
    processing the plurality of sectors via a read channel of the system; and
    during processing of the plurality of sectors, dynamically determining an order in which each sector included in the plurality of sectors is to undergo further processing based upon at least one of: a global iteration index of the sector, trapping set characteristics of the sector and processing latency of the sector.

17. The non-transitory computer-readable medium as claimed in claim 16, wherein dynamically determining the order in which each sector included in the plurality of sectors is to undergo further processing includes:

determining and assigning a quality metric for each sector included in the plurality of sectors based upon at least one of: global iteration index of the sector, trapping set characteristics of the sector and processing latency of the sector.

18. The non-transitory computer-readable medium as claimed in claim 17, the method further comprising:

when a first sector and a second sector included in the plurality of sectors have a same number of unsatisfied checks, but the first sector has a first global iteration index and the second sector has a second global iteration index, the first global iteration index being a greater value than the second global iteration index, the first sector is assigned a first quality metric and the second sector is assigned a second quality metric, the first quality metric being different than the second quality metric; and based upon the assigned first and second quality metrics, causing the second sector to undergo further processing prior to causing the first sector to undergo further processing.

19. The non-transitory computer-readable medium as claimed in claim 17, the method further comprising:

when a first sector included in the plurality of sectors is identified as having a trapping set error and a second sector included in the plurality of sectors is identified as not having a trapping set error, assigning a first quality metric to the first sector, assigning a second quality metric to the second sector, the first quality metric being different than the second quality metric; and based upon the assigned first and second quality metrics, causing the second sector to undergo further processing prior to causing the first sector to undergo further processing.

20. The non-transitory computer-readable medium as claimed in claim 17, the method further comprising:

when a first sector included in the plurality of sectors has a first processing latency value and a second sector included in the plurality of sectors has a second processing latency value, the first processing latency value being greater than the second processing latency value, assigning a first quality metric to the first sector, assigning a second quality metric to the second sector, the first quality metric being different than the second quality metric; and based upon the assigned first and second quality metrics, causing the first sector to undergo further processing prior to causing the second sector to undergo further processing.

* * * * *